(12) United States Patent
Pun

(10) Patent No.: US 7,768,992 B2
(45) Date of Patent: Aug. 3, 2010

(54) TDMA CHANNEL ACCESS SCHEDULING WITH NEIGHBOR INDIRECT ACKNOWLEDGMENT ALGORITHM (NBIA) FOR AD-HOC NETWORKS

(75) Inventor: Ngan-Cheung Pun, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 1062 days.

(21) Appl. No.: 11/428,862

(22) Filed: Jul. 6, 2006

(65) Prior Publication Data

US 2008/0008138 A1    Jan. 10, 2008

(51) Int. Cl.
*G06F 15/16* (2006.01)
(52) U.S. Cl. ........................ 370/347; 370/338
(58) Field of Classification Search .......... 370/347, 370/338, 310, 328, 329, 345, 350
See application file for complete search history.

(56) References Cited

U.S. PATENT DOCUMENTS

| | | | |
|---|---|---|---|
| 6,628,620 B1 | 9/2003 | Cain | 370/248 |
| 6,894,985 B2 | 5/2005 | Billhartz | 370/252 |
| 6,975,614 B2 | 12/2005 | Kennedy | 370/338 |
| 2002/0067736 A1* | 6/2002 | Garcia-Luna-Aceves et al. | 370/442 |
| 2002/0167960 A1 | 11/2002 | Garcia-Luna-Aceves | 370/442 |
| 2004/0218582 A1 | 11/2004 | Kennedy et al. | 370/351 |
| 2005/0053004 A1 | 3/2005 | Cain et al. | 370/235 |
| 2005/0074025 A1 | 4/2005 | Shao et al. | 370/461 |
| 2006/0018298 A1 | 1/2006 | Dilipkumar et al. | 370/345 |
| 2006/0128402 A1 | 6/2006 | Lee et al. | 455/464 |
| 2008/0247376 A1* | 10/2008 | Del Prado Pavon et al. | 370/345 |

FOREIGN PATENT DOCUMENTS

WO    2005/076544    8/2005

* cited by examiner

*Primary Examiner*—Sam Bhattacharya
(74) *Attorney, Agent, or Firm*—Allen, Dyer, Doppelt, Milbrath & Gilchrist, P.A.

(57) ABSTRACT

A mobile ad-hoc network (MANET) includes a source mobile node, a destination mobile node, and a plurality of neighboring mobile nodes. The mobile nodes are operative for contending for a plurality of time division multiple access (TDMA) slots in a frame using beacons. Each neighboring node selects a TDMA slot per frame. For neighboring nodes not receiving an acknowledgment for successful beacons, those nodes contend on empty TDMA slots and resolve residual collisions using a collision detection mechanism.

23 Claims, 10 Drawing Sheets

TDMA CHANNEL ACCESS SCHEDULING WITH NEIGHBOR INDIRECT ACKNOWLEDGMENT ALGORITHM (NBIA) FOR AD-HOC NETWORKS

FIELD OF THE INVENTION

The present invention relates to ad-hoc communications networks, and more particularly, to time division multiple access (TDMA) channel access scheduling systems and related methods used in an ad-hoc communications.

BACKGROUND OF THE INVENTION

Mobile ad-hoc networks (MANET's) are becoming increasingly popular because they operate as self-configuring networks of mobile routers or associated hosts connected by wireless links to form an arbitrary topology. The routers, such as wireless mobile units, can move randomly and organize themselves arbitrarily as nodes in a network, similar to a packet radio network. The individual units require minimum configuration and their quick deployment can make ad-hoc networks suitable for emergency situations. For example, many MANET's are designed for military systems such as the JTRS (Joint Tactical Radio System) and other similar peer-to-peer or independent Basic Service Set Systems (IBSS).

TDMA technology is becoming more popular for use in these mobile ad-hoc network systems. In a TDMA ad-hoc network, channel access scheduling is a platform of the network structure. Some problems are encountered with distributed channel scheduling used in a multi-hop broadcast networks. As known to those skilled in the art, the optimum channel scheduling problem is equivalent to the graph coloring problem, which is a well known NP-complete problem, cited in numerous sources. Many prior art systems assume that the network topology is known and is not topology transparent.

There is a changing topology in a TDMA network. Before the network is formed, the topology cannot be learned. Without knowing the network topology, the nodes in the network must still find a way to communicate. Once the nodes learn about the transmit and receive schedules among neighbor nodes, these neighbor nodes may have moved away, disappeared, or new nodes may have moved in. The rate of resolving the scheduling must be fast and bandwidth efficient such that the network can be stabilized.

Additionally, there could be problems associated with distributed processing, overhead bandwidth, and network scalability. Centralized processing may not survive the changing topology, such as a partition in the network. Too much network bandwidth for scheduling could have a slow response to a change of topology. The scheduling is better off and scalable if it is highly distributed. A single point of failure could also be costly in terms of stability and speed of convergence.

A mobile ad-hoc network, with no fixed infrastructure, has also posed many challenges to the media access control (MAC) layer for multiple users. In a TDMA based ad-hoc network, it is sometimes difficult to assign non-interfering time slots to nodes and still allow spatial reuse of the bandwidth and time slots. Different nodes that are separated far enough would be able to reuse the bandwidth by using the same time slot.

A Carrier Sense Multiple Access (CSMA) based MAC design for an ad-hoc network is sometimes suitable for data transmission between mobile nodes. For example, 802.11 standards do not support voice or multimedia traffic with a desired quality of service because the transmission is contention based and asynchronous. The sharing of a radio resource often becomes indeterminist. To support voice and video streams, the system often requires bandwidth to be reserved. This could be accomplished in some TDMA based schemes by using non-interfering time slots, for example, channel scheduling.

A Code Division Multiple Access (CDMA) based system is bandwidth efficient in traditional cellular networks but it relies on adequate power control, maintained by the base station, for eliminating the near/far effect. In a mobile ad-hoc network environments, however, CDMA technology has encountered some difficulties.

There are many algorithms now being developed on the TDMA channel scheduling for mobile ad-hoc networks, but many of these proposed solutions are based on having an adequate knowledge of the network topologies. Such methods would require a substantial amount of overhead in the network, as the processor may be required to collect information about the entire network. In a highly mobile ad-hoc network, on the other hand, the information being collected may become stale at any moment. Therefore, the lightness in overhead and relative speed of generating the channel schedules become important factors in the design of the Media Access Control layer in mobile ad-hoc networks.

SUMMARY OF THE INVENTION

A mobile ad-hoc network (MANET) includes a source mobile node, a destination mobile node, and a plurality of neighboring mobile nodes. The mobile nodes are operative for contending for a plurality of time division multiple access (TDMA) slots in a frame using beacons. Each neighboring node selects a TDMA slot per frame. For neighboring nodes not receiving an acknowledgment for successful beacons, those nodes contend on empty TDMA slots and resolve residual collisions using a collision detection mechanism.

From one aspect, the neighboring nodes can be positioned within a two-hop distance. Each node can continue on a TDMA slot for a plurality of frames. Residual collisions can be resolved using a void of bits within a beacon occupancy vector (BOV). Residual collisions can be resolved using a message exchange mechanism with a selected neighboring node by temporarily swapping a beacon transmission time with an arbitrarily selected neighboring node to detect beacon collisions. An acknowledgement message can be embedded into a beacon by selecting most recently heard beacons that are referenced to a transmission time within a single frame. It is possible to use a two-level BOV to distribute TDMA slot occupancy information to neighboring nodes and compensate for topology change due to no movement.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A practical bandwidth efficient, fast converging and distributed system and related method for TDMA dynamic channel access scheduling is described. The system and method can rely on mobile units or nodes to help each other in a distributed manner to resolve slot assignments.

In accordance with one non-limiting example of the present invention, automatic network formation in TDMA mobile ad-hoc networks (MANET's) can be based on the mutual assistance of neighboring nodes. In one non-limiting example, the system and method can be referred to as a Neighbors Indirect Acknowledgement Algorithm (NbIA). This type of algorithm used in the system and method has fast convergence, a distributed mechanism and low protocol overhead. The Neighbor Indirect Acknowledgement Algorithm is a fast, distributed, concurrent channel access scheduling algorithm with low bandwidth overhead. The neighboring nodes assist each other to find a slot, e.g., beacon slot, in a concurrent manner. It includes a distributed mechanism such that neighboring nodes concurrently propose their aimed beacon slots, and at the same time acknowledge to those recent successful contentions. The other collisions will be resolved by an exchange mechanism with the neighboring nodes. This type of system (or mechanism) has fast convergence and most of the local access scheduling can be resolved in a few frames. The mechanism also has low bandwidth overhead in which the beacon bandwidth is low because the acknowledgement message is embedded into the contention beacons. It is robust because the mechanism does not require a specific head to orchestrate and there is no single point of failure.

Figure 1:
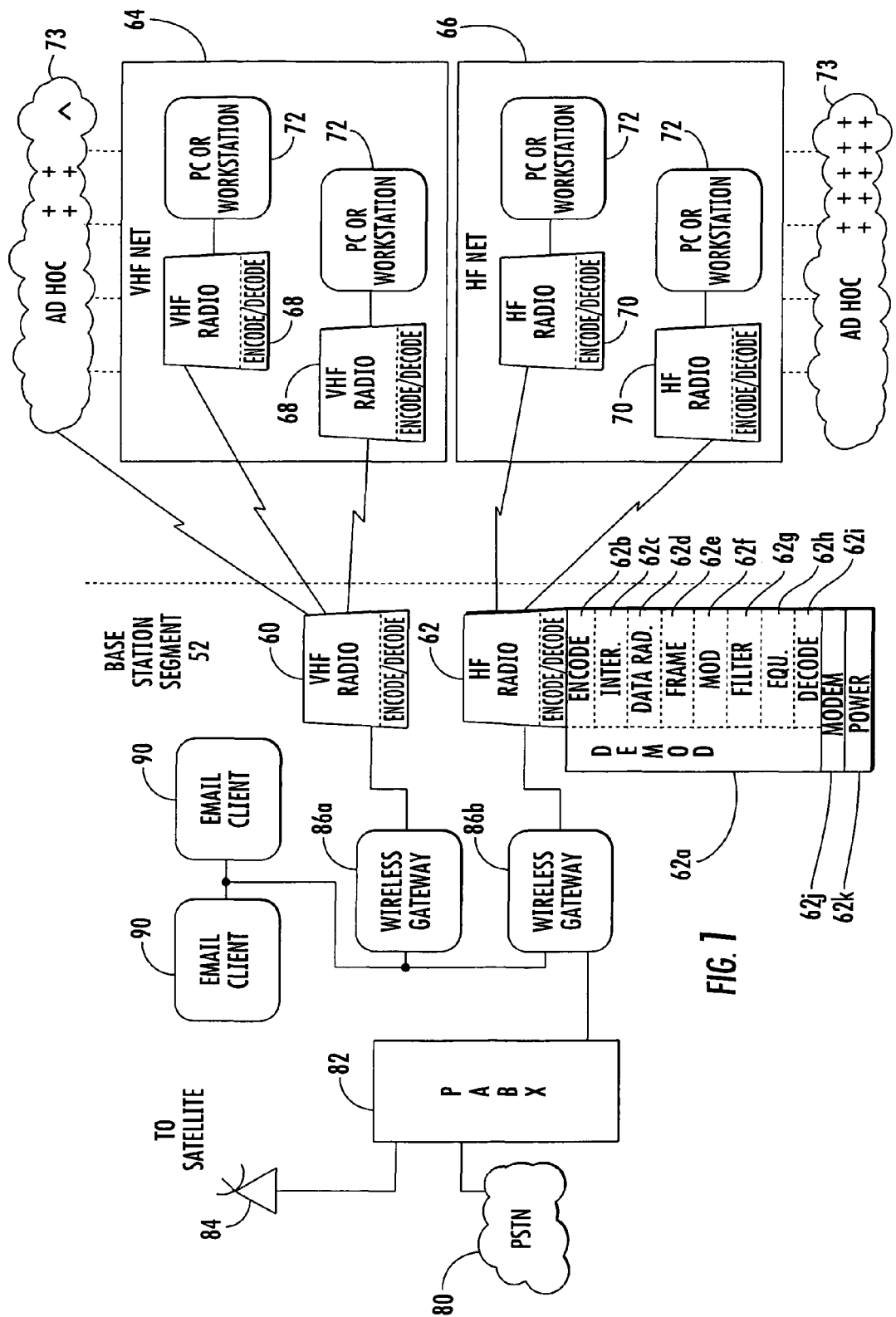
FIG. 1 is a block diagram of an example of a communications system that can be used for the present invention.

For purposes of description, some background information of coding, interleaving, and an exemplary wireless, mobile radio communications system that includes mobile ad-hoc network capability and can be modified for use with the system and method of the present invention is now set forth with regard to FIG. 1. An example of a radio that could be used with such system and method is a Falcon™ III radio manufactured and sold by Harris Corporation of Melbourne, Fla. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt-.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SOR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that would benefit from the present invention is described relative to a non-limiting example shown in FIG. 1. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. Ad-hoc communication networks 73 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. These and other circuits operate to perform any functions necessary for the present invention, as well as other functions suggested by those skilled in the art. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 2:
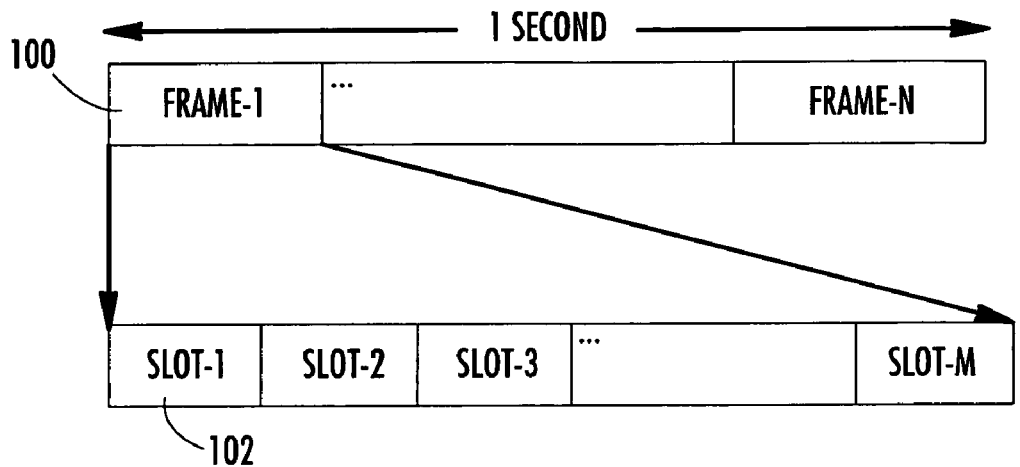
FIG. 2 is a block diagram showing a generalized TDMA scheme that provides a reference for describing the algorithm used for forming a mobile ad-hoc network (MANET) in a non-limiting example of the present invention.

As set forth, there are a number of common terms used throughout the description. For example, a slot can be a basic TDMA time division structured by frames and slots. In each second, there are typically N number of frames, and in a frame, there are M number of time slots such as shown in FIG. 2 showing a number of frames 100 and slots 102. Usually, each active mobile unit would have a chance, i.e., a time slot, to transmit in every frame.

A frame can be considered as a general TDMA time division unit as explained in reference to a slot.

A beacon can be a TDMA burst that is usually short and completed to one slot. It could contain control information or controlled messages. In a HP-Net, a beacon can be transmitted in a slot. In a general TDMA scheme, it is typically transmitted in a generic time slot.

A beacon slot is typically the same as a slot.

In a 1-hop neighborhood, any neighboring node that is directly connected with a single link could be considered as the 1-hop neighborhood.

In a 2-hop neighborhood, any neighboring nodes that are directly connected with the maximum of 2-hops, 2 links away, could be considered as a 2-hop neighborhood.

Network density could be referred to as the number of nodes in a per 1-hop neighborhood, the number of nodes in a per 2-hop neighborhood, or the number of nodes in a per geographical area.

A node could represent a mobile unit in a network topology.

Users are typically considered nodes and sometimes are also called mobile users.

The internal timing reference (INTR) can be a timing reference that typically is known to the mobile unit itself.

A network timing reference (NTR) is typically a common timing reference in the network, for example, a single HP-Net. It could indicate when an epoch or a frame should start. The nodes in the network typically agree on a common timing as the network timing reference. If GPS is available, it could be a source for the network timing reference.

GSN is typically a node that is elected to present the network timing reference (NTR). The timing of its frame is regarded as the NTR.

With timing synchronization, the timing of the frame in the network is aligned. The nodes are synchronized to the NTR, which can be GPS based or mutually elected GSN based.

With synchronization, when the NTR is achieved, the network can be called synchronized. In the HP-Net scenario, when the epoch timings of all the nodes are aligned, the network is considered synchronized. IF GPS is available, the nodes are readily and immediately synchronized to the GPS timing.

With a timing reference node, the node that represents the network timing reference could be the same as GSN.

In a confirmed status, the contention is successful and an acknowledgment about the success is received.

Acknowledged would be the same as confirmed.

In transmission scheduling, a node determines which time slot it should use in the frame. It could stick to that slot in all subsequent frames in a transmission schedule. Thus, the node that resolved the slot conflicts with the neighboring nodes in the network form a well established schedule.

In channel access in TDMA, a channel can be defined by an exclusive use of a time slot in multiple frames. A node could be considered to have a channel when it is allowed to use a fixed time slot in all subsequent frames.

A channel collision could be a continuous slot collision in multiple frames. It usually results from more than one node trying to transmit in the same net channel, which is the same slot in the frame.

Channel access scheduling can be the same as transmission scheduling.

A unique node ID could be the physical, unique media access control (MAC) address of the node. For example, for a network size of two hundred (200), the minimum number of bits required for the unique ID could be eight (8) bits.

A Beacon Occupancy Vector (BOV) is a bit map, with each bit representing slot occupancy. The numeral 1 could represent that the slot is taken, while the numeral 0 could represent that the slot is empty. A BOV bit map could be the same as the BOV.

Automatic network formation could be based on the mutual assistance of all neighboring nodes. The algorithm used for the system and method, in accordance with non-limiting aspects of the invention, could be termed a Neighbors Indirect Acknowledgement Algorithm (NbIA). Key attributes of the algorithm are fast convergence, distributed mechanisms and low protocol overhead. The Neighbor Indirect Acknowledgement Algorithm (NbIA) typically is a fast distributed concurrent channel access scheduling algorithm with low bandwidth overhead. The neighboring nodes assist each other to find a slot in a concurrent manner. Because it is a distributed mechanism, all "n" neighboring nodes concurrently propose their aimed slots, and at the same time, acknowledge to those recent successful contentions. The rest of the collisions could be resolved by an exchange mechanism with the neighboring nodes. Because of fast convergence, most of the local access schedule can be resolved in a few frames. The beacon bandwidth requirement is low because the acknowledgement message is embedded into the contention beacons. It is also robust because the mechanism does not require a specific head to orchestrate the scheduling. There is no single point of failure.

Figure 3:
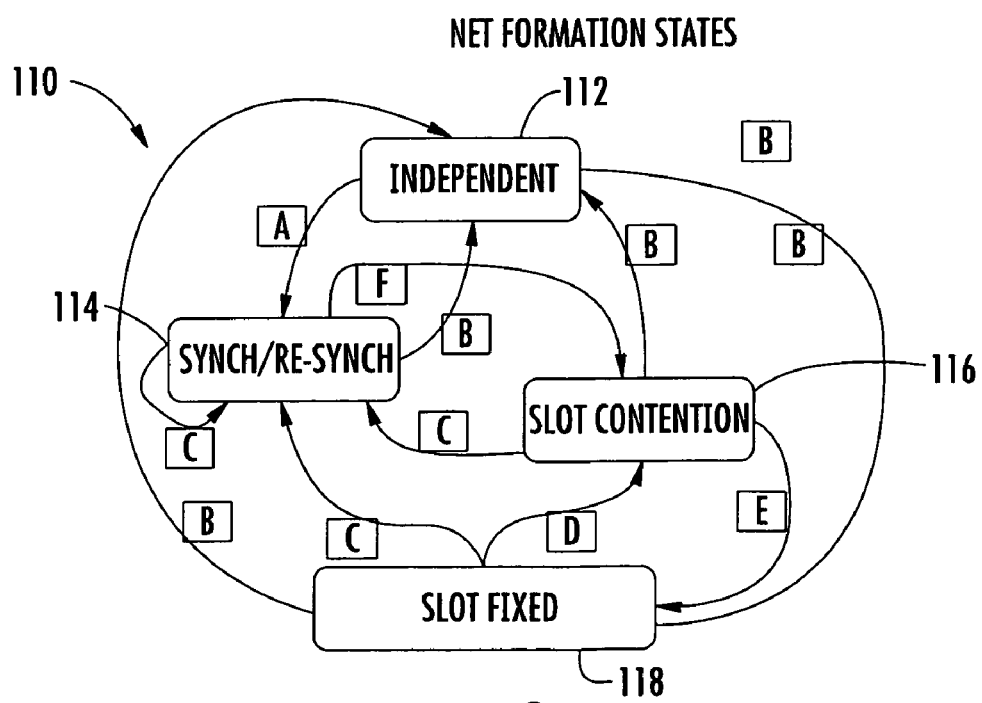
FIG. 3 is a state diagram showing state changes from an independent state to net formation states in the MANET as described in accordance with non-limiting examples of the present invention.

FIG. 3 shows an example of a state diagram at 110 depicting the major state changes from an independent state 112 to net formation states shown as Synch/Resynch 114, Slot Contention 116 and Slot Fixed 118. The state diagram 110 has certain events as noted in the table below:

| | |
|---|---|
| A | 1. Has GPS; Declared as GSN. |
| | 2. Rx beacon representing network timing |
| B | No Neighbor for X1 number of seconds |
| C | Higher preference network timing reference observed |
| D | Collision indicated |
| E | Contention Success Acknowledgement |
| F | (Action) Adjusted the internal timing reference |

Figure 4:
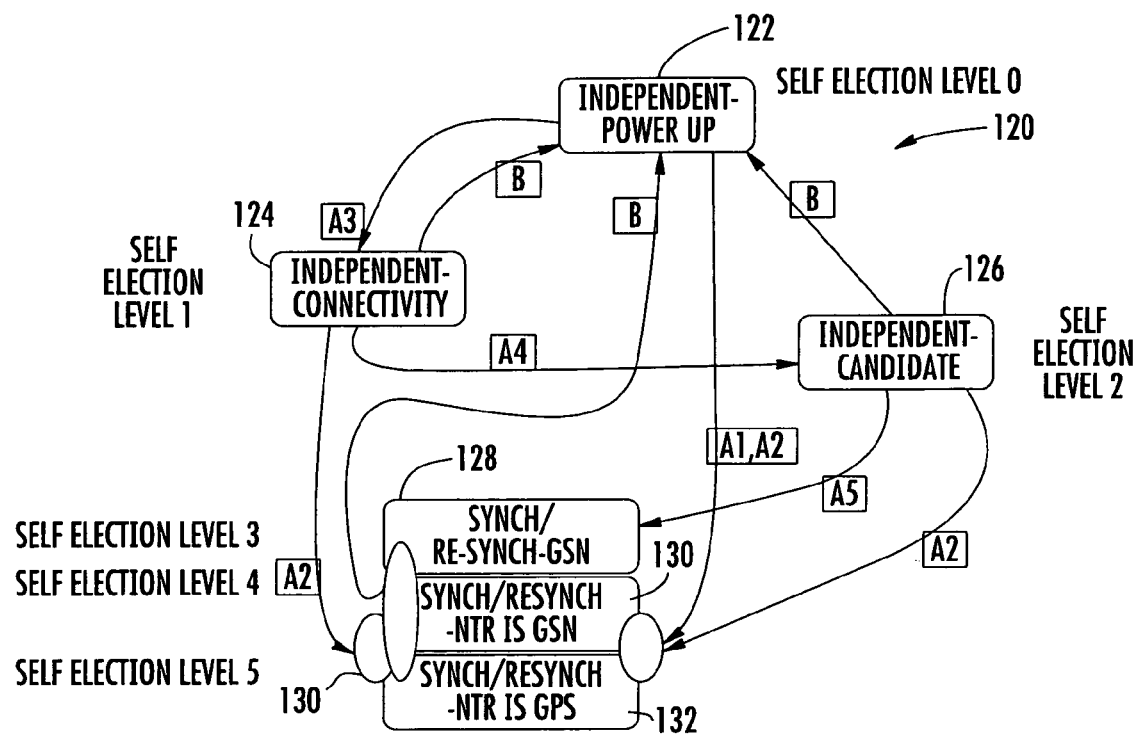
FIG. 4 is a state diagram showing state changes from an independent state to synchronized state having three sub-states in the MANET as described in accordance with non-limiting examples of the present invention.

Regarding this state diagram shown in FIG. 3 and in the state diagram shown in FIG. 4, the states presented are the main states. It illustrates the concurrent nature and flexible state flows in the algorithm. The set of detailed election states changed from the "Independent" state 112 to a "Synchronized" state 114 is simplified in FIG. 2.

The more detailed synchronization state diagram is shown in FIG. 4, in which the state change from an independent state to a synchronized state is depicted. This state diagram 120 includes independent power up 122, independent connectivity 124 and independent candidate 126. It includes Synch/Resynch for GSN 128, when NTR is GSN 130 and when NTR is GPS 132. The synchronized state has these three substates 128, 130, 132. These states are aggregated into two distinct states in FIG. 3, "Independent" 112 and "Synch and Resynch" 114. The events are described in the table below and also relevant to the graph and diagram shown in FIG. 5:

| | |
|---|---|
| A1 | Has GPS |
| A2 | Rx Beacon of NTR |
| A3 | Rx ACK from independents 124 or 126 |
| A4 | Rx ACK from 124 or 126 |
| A5 | Rx ACK from 126 |

It is assumed that the algorithm will operate in various system environment settings. With TDMA structural limitations and settings, if there are M slots per frame, the maximum number of nodes actively communicating is typically less than M in any 2-hop neighborhood.

There are certain radio capabilities and assumptions, for example, that the nodes do not have collision-sensing capability. Collision sensing typically is the ability of a node to categorize the received signal into three different categories: (1) signal received; (2) signal not received, and (3) signal not received with collision being sensed by the physical layer. Without collision sensing, a radio (the physical layer) cannot distinguish the difference between a collision and no signal.

It should also be understood that GPS may or may not be available and nodes are all operating on one frequency. With network and environmental assumptions, most of the communication links between nodes are bidirectional. For instance, 80% could be bidirectional and the number of nodes with GPS could range from none to all.

In general, the net formation process is divided into two stages. Each node will progress through the two stages. Referring again to the state diagrams in FIGS. 3 and 4, it is evident that stage 1 is defined by the "Independent" state 112 and "Synchronization and Resynchronization" state 114. Stage two is defined by the "Slot Contention" state 116 and "Slot Fixed" state 118, but the network formation is the aggregated result of a group of nodes acting in a concurrent way. Each individual node can be in any state and can interact with the other nodes independently. Stage one can be referred to as Synchronization (SYN). With GPS, a node is already considered as "synchronized." It could broadcast its beacon according to the GPS timing, on the second mark alignments. If there is one GPS node in the system, the whole network could be synchronized with reference to GPS. Without GPS, a node should first synchronize with the others.

There is one node that will be elected to represent the network timing reference, the GSN. This timing will propagate throughout the network. There could be multiple GSN's elected concurrently in different parts of the network. An arbitration rule, which results in a single timing reference could be defined such that GPS timing overrules any regular GSN timing. The NTR with a smaller GSN ID could overrule the larger GSN ID.

Stage two can be referred to as Slot Contention, Collision Detections and Confirmation (SCCDC). Once the net reference timing is known (GPS or GSN based), nodes will help each other to obtain a non-interfering time slot.

In addition to the net formation stages, timing reference propagation is an ongoing process that is running at most or all stages of net formation. A timing reference can be propagated throughout the network. Some rules could govern the way a timing reference can propagate throughout the network. If the node has not synchronized its internal timing to an external timing reference, and it receives a packet that has a timing reference (NTR), the node adopts the received timing reference. If the node is already synchronized to a NTR (X), but has received a new and different NTR (Y) with a higher preference, the node will follow the NTR (Y) and abandon the NTR (X).

Figure 5:
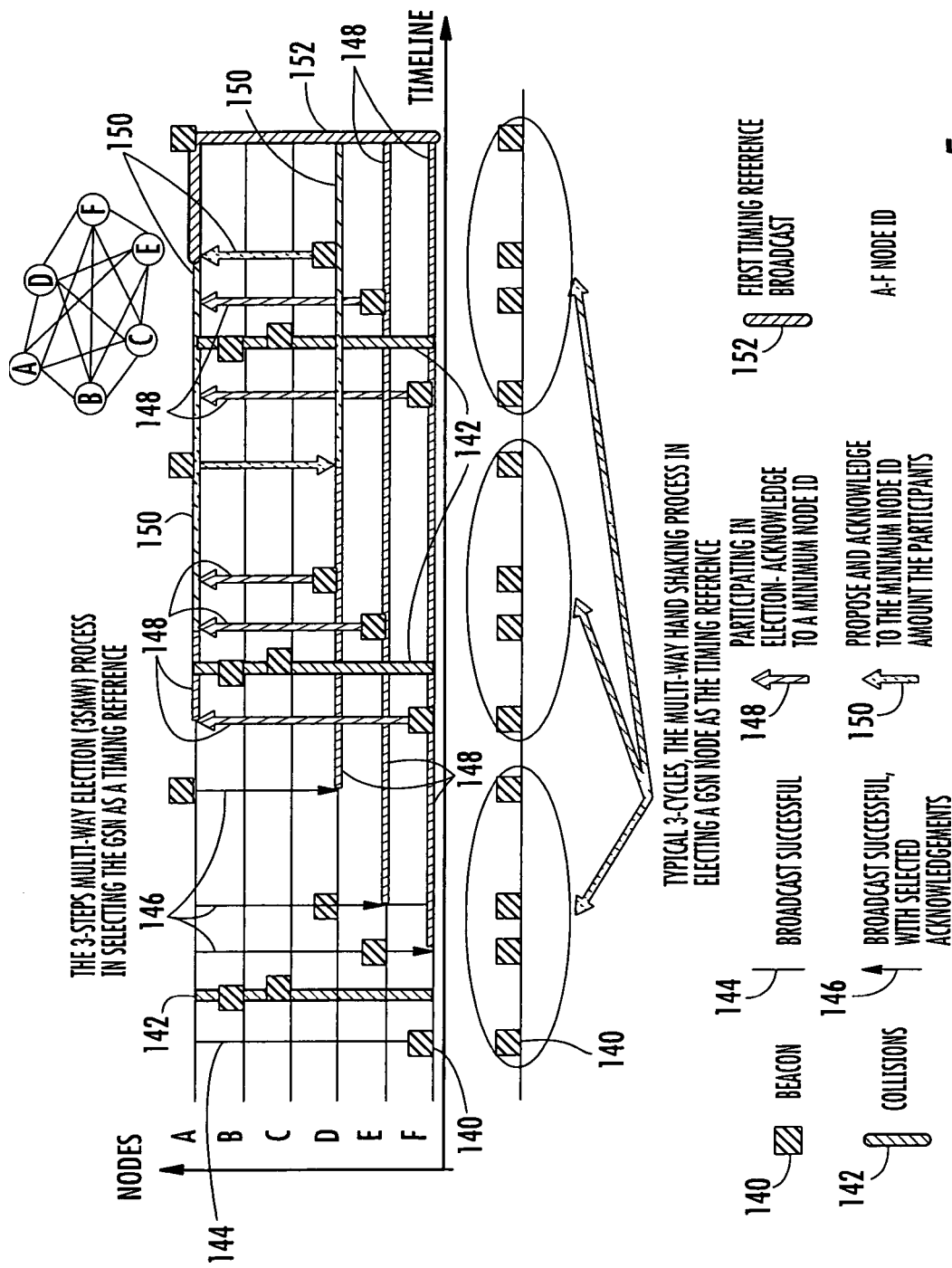
FIG. 5 is a graph and associated mobile node diagram showing an example of six mobile nodes in 1-hop neighborhoods and electing a mobile node as a GSN to act as a timing reference in which the vertical axis of the graph represents a node ID and the horizontal axis represents increasing time, and covering about three epoch intervals in time for the MANET as described in accordance with non-limiting examples of the present invention.

The synchronization (SYN) stage could be part of this stage of the net formation algorithm and could select a timing reference. The procedure can also be termed a 3-Steps Multi-Way (3SMW) election process as shown in FIG. 5. The election of a GSN favors a node with the following characteristics:

1. The node ID is quite small (used as an arbitration rule);
2. The node has engaged in a three steps hand-shake with its neighbors (similar to 3-way hand-shaking, but with multiple nodes);
3. The node is visible to another one of a group of nodes; and
4. A bidirectional link exists to at least one of its neighbors.

If the process is simplified to a two-step handshaking, a deadlock could develop while electing the GSN in the local neighborhood. Algorithm actions are performed during the Synchronization Stage. These include:

1) Concurrent and periodic actions; and
2) Event driven actions.

In concurrent and periodic actions a beacon slot is selected according to the node's Internal Timing Reference (INTR). A new beacon slot can be selected randomly every X1 number of epochs (default X1=5) intervals (controlled by a timer), if the NTR is not detected or the node's beacon transmissions are not ACK'd by at least one other node. The timer and the SYN task can be deactivated when the timing reference is confirmed, but the SYN task can be reactivated if the node finds itself alone for a number of seconds (default=30 seconds). It is possible to transmit a beacon with ACK's. The beacon could be scheduled once every epoch. The ACK message could contain the node IDs of up to X2 neighboring nodes (default X2=4, where X2 is a configurable parameter in the algorithm) with beacons that have been correctly received during the previous YmS period (default Y=125 mS).

In event driven actions, a random time is selected as the Internal Timing Reference (INTR). This action is executed when the node is first started up. If GPS is available, the timing reference can be aligned with the exact Second Mark of the GPS. If a new NTR is received, the timing reference can be set to align with the new received time reference. Upon receiving a beacon, a check for acknowledgement message (ACK) is sent. If the beacon contains an ACK acknowledging the receiving node's prior beacon transmission, the receiving node upgrades its "Self Election-Status" in the process of electing a node as the GSN. The Self Election levels are shown in FIGS. 3 and 4. These are different election levels that could be numbered 0-5 in FIG. 4 corresponding respectively to the states numbered 122, 124, 126, 128, 130 and 132.

Upon receiving an ACK message, the receiving node's Self Election Status may be upgraded. One requirement could be that the upgrade in Self Election Status must be gradual, i.e., it can be incremented by one at a time. Another requirement could be that the node's updated Self Election Status can only be one level higher than the Self Election Status level of the sender of the ACK. If multiple GSN's are elected, the one with minimum ID number prevails (all other GSN nodes resign this role if they receive a beacon from another node with a smaller Node ID that advertises GSN status).

Upon receiving a beacon, the Node ID of the sending node is recorded, and the smallest Node ID as the GSN candidate is maintained. It could be included, as outgoing ACK, in the next TX packet (during the Synchronization Phase, each beacon acknowledges the transmission of one (or no) adjacent nodes).

FIG. 5 is a graph and accompanying node diagram illustrating an example of six nodes, all in 1-hop neighborhoods, electing a node as GSN and the GSN acting as the timing reference. The vertical axis represents node ID and the horizontal axis represents increasing time. Beacons are shown at 140, collisions at 142, broadcast successful at 144, broadcast successful with selected acknowledgments at 146, participating in election acknowledge to a minimum Node ID 148. Propose and acknowledge to the minimum node ID amount the participants 150, and first timing reference 152.

The diagram covers three approximately 3-epoch intervals in time. In this example, this node ID can be represented by levels A-F. In the node ID comparison, A is considered as "less" than B, and so on. If GPS is available in the network, NTR is immediately achieved by GPS. 3SMW is not triggered. In the diagram of FIG. 5, all six nodes start up at different times within the first cycle (for example 125 ms) of operation. They all have their own internal timing reference (INTR). They all participate in the GSN election process. Their transmission schedules do not change for five cycles. During the first cycle all six nodes randomly select their own timing reference and beacon slot relative to the node's selected timing reference. The nodes keep checking if the GSN or GPS has been declared (this occurs at the vertical bar 152). The different horizontal lines represent the node's Self Election State. The Self Election State changes upon receiving an acknowledgement (an ACK is indicated by an arrow head). In a second cycle, a node ACK's its neighbors with the smallest Node ID and the rule that a node can not increase its election state more than one level above that of the node that transmitted the ACK. In a third cycle, Node-1 increments its Self Election State to and declares itself a GSN during its next beacon opportunity. There are three major tasks that a node can perform to resolve beacon slot conflicts:

A. Slot Contention,

B. Collision Detection, and

C. Slot Confirmation.

These tasks can be executed periodically until beacon slot conflicts are no longer detected. Under all tested conditions, this phase of the net formation algorithm exhibits a rapidly decreasing number of beacon slot conflicts.

Slot contention typically is the process by which a node selects a beacon slot. A node randomly selects a slot from its database of unoccupied beacon slots, i.e. its Beacon Occupancy Vector (BOV). The BOV is maintained as a bit map in which each bit represents the occupancy status of a beacon slot. The internal BOV can be broadcasted to the neighbor nodes. The BOV typically only has local (X number of hops radius, default X=2) significance. When a node contends on an empty slot, it consults its BOV bitmap before making a selection. The information in the bitmap BOV typically must be updated as often as possible as described below.

The information (slots being taken) of a node's BOV can be obtained from two sources. A first source is BOV-1 where a node's observation is directly on the neighbors slot usage. The BOV information can be directly extracted and it has 1-hop significance. A second is BOV-X (for example, BOV-2 is from a 2-hop neighbor). The information from BOV messages are sent by the neighbor nodes and have multi-hop significance.

The final BOV, when used for consultation, is obtained from the OR-ed of all of the BOV-X, which is stored in a stack. The whole BOV-X stack can be sent to the neighbor via the beacon message. The direct neighbor bitmap BOV-1 can be placed at the top (entry-1) of the stack. The 2-hop neighbor bitmap BOV-2 can be placed at entry-2 of the stack. The 3-hop neighbor bitmap can be placed into entry-3, and so on.

The propagation of BOV entries can be controlled by a configurable Time-To-Live (TTL) parameter. With TTL=1, the BOV-1 can be broadcasted to 1-hop neighbors. If a node has a TTL=2, then BOV-1 and BOV-2 will be sent, and BOV-1 propagates to two hops away. Every time a node relays a BOV entry, it is being pushed down the stack.

Figure 6:
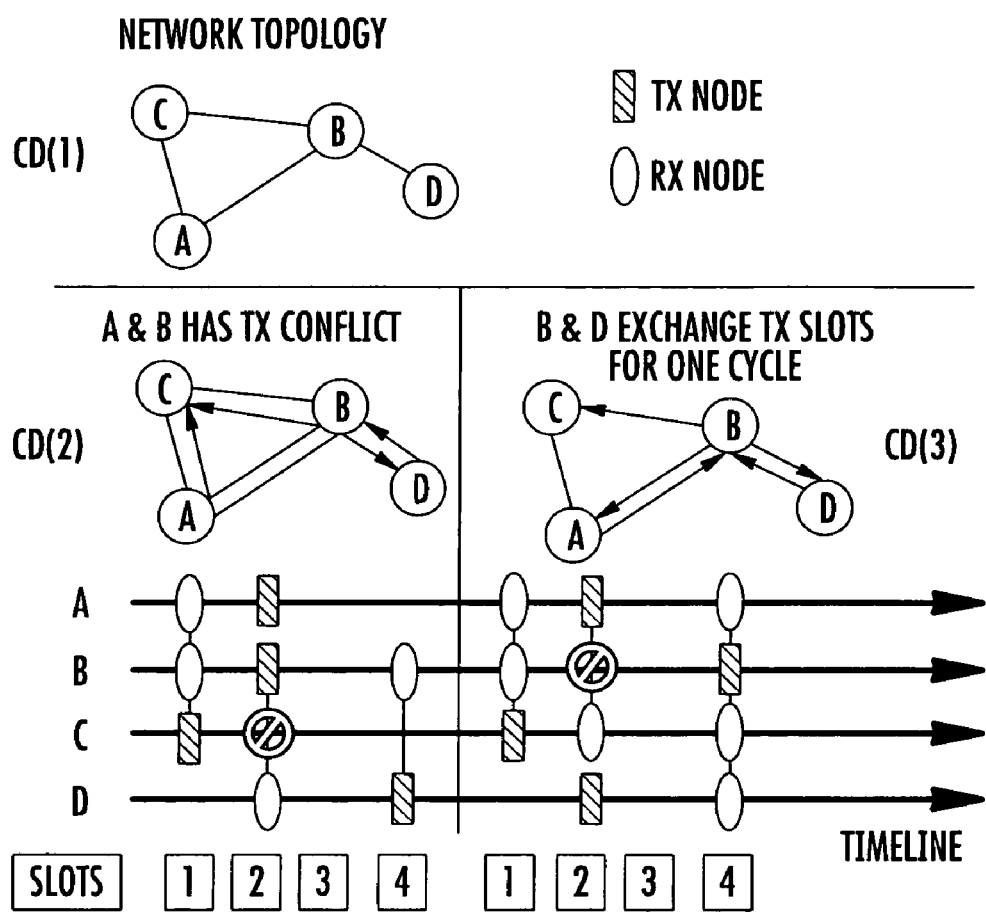
FIG. 6 is a graph and associated node diagram showing a collision detection mechanism and a network topology without conflicts, a directed graph of network topology of conflicts and directed links that are changed because of a schedule exchange for the MANET as described in accordance with non-limiting examples of the present invention.

Once a node has received confirmation (i.e. Acknowledgement) of its beacon, it keeps its TX schedule and continues to transmit its beacon in each subsequent epoch. A series of collision detection (CD) is in place to monitor the slot usage in the neighborhood. A node keeps its schedule until it determines (or finds out) that it is in conflict with another node. If a collision is detected, the node in conflict will contend for a new empty slot. Due to the difficulty of reliably detecting a collision, several different collision detection mechanisms can be used to verify, on an ongoing basis (i.e. in each epoch), that the selected slot is not used by another node in its 2-hop neighborhood. The mechanisms are shown in FIG. 6 showing three node designs and a bar hart with slots. The three designs illustrate the collision detection mechanism as CD(1), CD(2) and CD(3), i.e., CD(1) a network topology without conflicts; CD(2) directed graph of network topology showing conflicts; and CD(3) directed links changed due to a schedule exchange.

CD(1) is void of ACK. If a transmitted beacon is not confirmed by 1 or more neighbor nodes in a time interval=1 epoch, the node will contend for a new Beacon Slot. For example, in FIG. 5 as shown in CD(2), node-A transmits in slot two, but it does not receive ACK from the neighbors {B & C}. Node-A will contend for another empty slot.

CD(2) is void of bit set in BOV. For node X transmitting on slot A, if most of the neighbor nodes do not set their BOV bit for slot A, node X assumes that its beacon is in collision with the beacon(s) of another node(s). In the collision free case all neighbor nodes receive node X's beacon correctly and set the appropriate bit in their BOA as occupied. When the neighbor nodes send out their packets, node X checks the bit corresponding to slot A in each of the received beacons. However, it is also possible that some nodes will not report the slot as occupied due to propagation conditions, i.e., if the links is asymmetrical. If the network has a significant number of asymmetrical links the collision threshold associated with this collision detection mechanism must be increased.

A new collision detection threshold=(number of nodes not reporting the receiving node's beacon slot as occupied)/(total number of received beacons). A collision event is declared to have happened when the above ratio is greater than (>) a randomly selected number in the range of about 0.19-0.84. A new threshold within this range is selected every X epochs, e.g., X=2. The collision threshold is selected randomly (within the stated range) to avoid many neighboring nodes detecting collisions at the same time and consequently contending for a new beacon slot at the same time. The upper and lower threshold values have been selected based upon simulation results to date. This collision detection algorithm is executed once every epoch. For example, in FIG. 6 at CD(2) where A and B have a TX conflict, the directly observed BOV-1 is: A (BOV)=1100; B (BOV)=1101; C (BOV)=1000; and D (BOV)=0101. Node-B hears node-C and expecting a C (BOV)=x1xx, but has x0xx. Node-B detects an asymmetrical link. If the number of asymmetrical link exceeds the threshold then node-B will assume itself that it could be in conflict.

CD(3) is an Exchange Mechanism (EM). The previous two collision detection mechanisms successfully detect most collision events. There could be a small number of collisions, however, that are not detected due to an unusually large number of asymmetrical links. The EM mechanism, in which a node temporarily swaps its beacon transmission time with a neighboring node, is used to detect beacon collisions under this condition. To illustrate this mechanism, assume node A and B both use beacon slot X with the result that a collision occurs at node C. If node B temporarily switches its beacon slot with node D (which normally uses Slot Z), node C may receive two new beacons, i.e., node A in beacon slot X and Node B in beacon slot Z with the message "My beacon slot is normally slot X." In this event, node C will inform node A and B that it has detected a collision between node A and B in slot X.

A collision can also be deduced to occur if, following the swap, node B (that normally uses Slot X) does not receive node Z's beacon in slot X. EM must be executed infrequently because an exchange of beacon transmission schedule with a neighbor could cause a temporary collision at a 3-hop radius. For example, in FIG. 5, the exchange of TX schedule between node-B and node-D is shown in CD(2) and CD(3). The connectivity change can be detected by some nodes. Here during the exchange cycle, node-B should hear node-D but it does not. And also, node-A suddenly hears node-B unexpectedly. The anomaly implies collisions in TX schedules in the neighborhood.

There is also a fourth possible collision detection mechanism for Shifted-Look-Through (SLT). Each node (infrequently) selects an additional beacon slot for transmission. This extra transmission allows a node a chance to be discovered by other neighboring nodes if it was blocked by hidden collisions. This mechanism should not be executed frequently in order to avoid a situation in which several nodes simultaneously compete for the same empty Beacon Slot. For example, in FIG. 5 at CD(2) where A and B have Tx conflicts, slot 3 is not being used. If node-B schedules an extra Tx in slot 3, its two identical beacons on slot 2 and slot 3 will be sent in the same epoch. But only the beacon on slot 3 is successfully received by node-A. In the beacon PDU, it contains the slot ID=2. Node-A received an unexpected beacon on slot 3 but the PDU indicates a slot ID=2. Node-A realizes that the PDU is being sent via a SLT mechanism. If there is no collision on slot 2, node-A would be able to receive beacons in slots 2 and 3. Otherwise, there is a collision. Node-A will construct a collision indication into its beacon, notifying node-B that B is in conflict.

In a slot confirmation task, slot confirmation (SC) occurs locally (i.e., SC1 and SC2 indicated below) as well as on a HP-NET wide basis via communication with the GSN, i.e., SC3. Process SC1 has been described previously as part of the slot contention phase.

In a first task (SC1) Neighbor Indirect Acknowledgement (NBIA) occurs. A node (node-A) contends a slot by sending out its beacon. If there is no collision in that slot, the beacon will be heard by some neighbors. If node-B is one of those neighbors, by the time its node-B's turn to transmit, it will include an ACK in its beacon and indirectly acknowledge the successful transmission of node-A. The acknowledgement is indirect because the main purpose the beacon is to contend for an empty slot. And the acknowledging node (node-B) itself is also not particular targeted as the one that should respond with such acknowledgement. As the acknowledgement is received, node-A will keep its TX schedule until a new collision is detected.

In a second task, (SC2) diversity of NBIA messages occurs. The number of an ACK in a beacon is not restricted to one. A node may be able to acknowledge N beacon transmissions received in the preceding time interval=1 epoch. Increasing the value of N increases the net formation algorithm's speed of convergence. (Default N=4, it is determined in simulation that 4 is reliable enough in the network with all kinds of packet drops due to different channel impairments).

Figure 7:
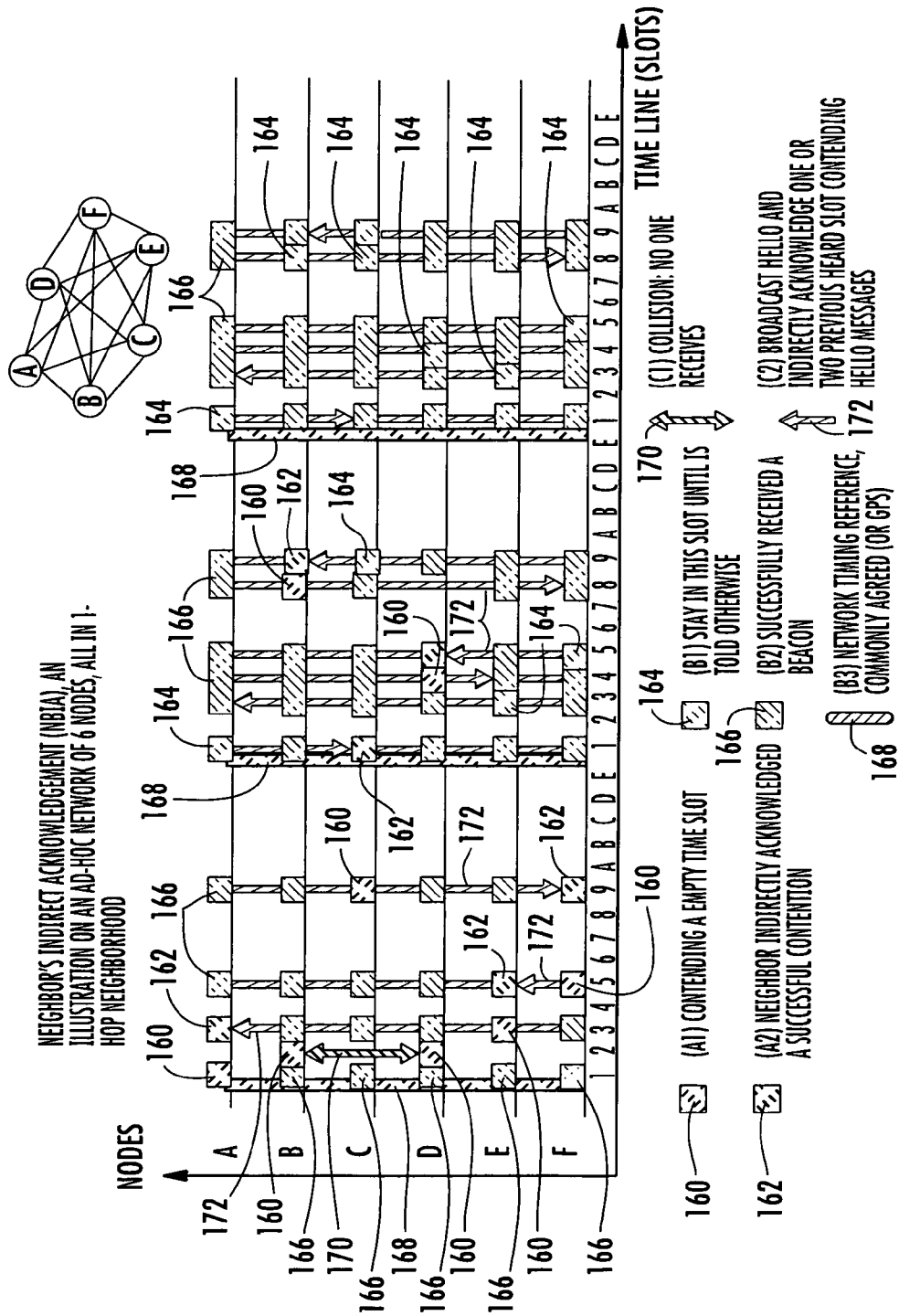
FIG. 7 is a graph and associated node diagram showing an example of a slot contention and confirmation process where the network has six nodes all in 1-hop of each other, either through 3SMW or SPS for the MANET as described in accordance with non-limiting examples of the present invention.

An example of the slot contention and slot confirmation is illustrated in the graph and node design shown in FIG. 7. Contending an empty time slot is shown at 160. A neighbor indirectly acknowledged a successful contention is shown at 162. A stay in this slot until is told otherwise is shown at 164. A successfully received a beacon is shown at 166. A network timing reference commonly agreed or GPS is shown at 168. A collision and no receives is shown at 170. A broadcast hello and indirectly acknowledging one or two previously heard slot contending hello messages is shown at 172. A neighbor's indirect acknowledgement stages can also be shown.

The example node design has six nodes. The number of slots could be any number larger than or equal to 6 (here assumed 14). It illustrates the mechanism of CD1 and SC1 as explained above. The network has 6 nodes, all in 1-hop of each other. It can be assumed that the NTR has been obtained, either through 3SMW or GPS. The nodes (A-F) internally and randomly picked their slots for contention. The ACK is packed along within the same beacon as the contention. Within three cycles, the contention and confirmation is completed.

It is assumed that all the nodes shown in FIG. 6 have already achieved NTR or epoch synchronization. At t=1, all nodes internally and randomly picked a slot based on the same NTR. They will send out the beacons accordingly. Some beacons will be colliding and some will not. For those beacons that are not colliding, the neighbor nodes will include acknowledgement within the same contending beacon. In a first cycle, node-A has a beacon on slot 1 (indicated at 160). All other nodes hear it (indicated at 166). Node-B and node-D have beacons on slot 2. Collision happens on all receiving nodes (indicated at 160). Node-E has beacon on slot 3 (indicated at 160). The beacon has ACK packed within the beacon (ACK to A). The NBIA diversity is 1 in this example. Node-A received confirmation, or ACK (indicated at 162) from node-E. In the next cycle (or epoch), node-A will stay TX in the confirmed slot (slot 1). Slot 4, it is left empty. No nodes happen to choose this slot. Slot 5, node F has a beacon. The beacon also contains an ACK to node-E. As node-E is the most recently sent beacon.

At slot 6 to slot 8, no nodes happen to choose these slots. At slot 9, node-C has a beacon. It also has an ACK to node-F, the most recently sent beacon. Node-F receives the confirmation. Slot A to Slot E, no nodes happen to choose these slots. This is the end of the epoch, and epoch-2 starts. At epoch-2 slot 1, node-A stays TX in slot 1. The beacon also has an ACK to node-C, the most recent sent beacon. Node-C received the confirmation. Node-B and node-D did not receive any ACK for the 1 epoch time span. These nodes decided to contend for new empty slots again. Node-B picks slot 8 and node-D picks slot 4. At epoch-2, slot 2, no node is scheduled to TX. At epoch-2, slot 3, node-E stays TX is slot 3. It continues to put ACK to node-A. For node-A, the ACK is not doing anything extra. At Epoch-2, slot 4, node-D has a beacon to TX. Its beacon also has an ACK to node-E. Node-E has been confirmed before, so it will ignore the ACK. At epoch-2, slot 5, node-F stays TX in slot 5 and its beacon also has an ACK to node-D. Node-D has received a confirmation the first time.

The NBIA is modeled and simulated against various network configurations and system parameters as shown in the simulation results of two examples explained below. One is static (1 meter/second) and another is in movement (30 meters/second). The network parameter is configured as listed in the table.

| NETWORK PARAMETERS | |
|---|---|
| System Parameters | Value |
| Simulation Time | 10; 18 seconds |
| Number of Frames per Second | 8 |
| Number of Slots per Frame | 50 |
| Node Radio Bandwidth | 10 Mbps |
| Bandwidth per Link | 200 kbps |
| Bandwidth consumed (Overhead) | 1.264 kbps (0.632%) |
| Network Size | 200 nodes |
| GPS capability | Disabled |
| Maximum Radio Range | 1.5 km |
| Link impairments | AGWN, packet loss increases at higher SNR |
| Network Area | 8 km × 8 km |
| Network Topology | Randomly distributed |
| Node Movement (at a random direction) | 1 mps; 30 mps |

In this example there are eight frames. Part of the slot bandwidth is consumed by the control messages. The control message contains information such as Node ID, Status, and ACK and so on.

The simplified control message can contain the fields shown in the table below. The total number of bits in the control message can be 158 bits in one non-limiting example. In this example, the BOV level is 2 (TTL+2) and the NBIA diversity is set to 4.

| Control Message Fields | Number of Bits |
|---|---|
| Node ID | 8 |
| Slot ID | 6 |
| NTR ID | 8 (for identifying synchronization source) |
| Synchronization Status | 4 |
| BOV-1 | 50 |
| BOV-2 | 50 |
| ACK-1 | 8 |
| ACK-2 | 8 |
| ACK-3 | 8 |
| ACK-4 | 8 |
| Total Overhead Bits | 158 |

Figure 8:
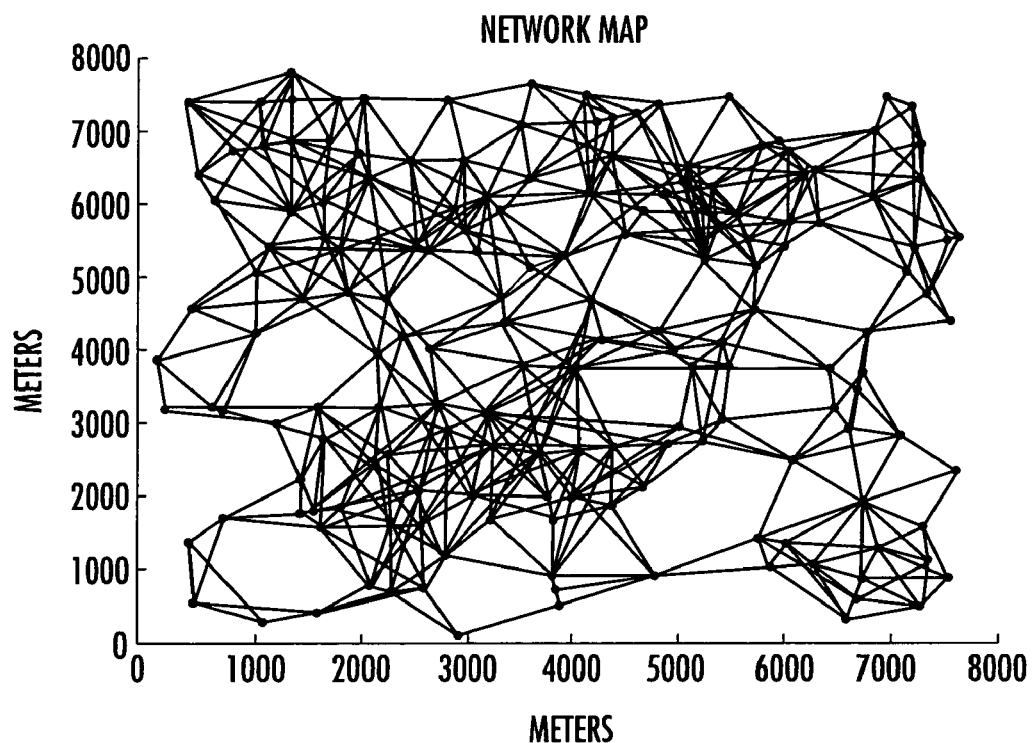
FIG. 8 is a graph showing an example of a network topology of 200 nodes with the vertical and horizontal axis in meters for the MANET as described in accordance with non-limiting examples of the present invention.

FIG. 8 shows an example of a network topology of 200 nodes in an area of about 8000 by about 8000 meters. In a static network, as the network starts up, the network synchronization and channel scheduling takes place. The scheduling resolves the slot conflicts. In about 2 seconds, the whole network converges down to a low level of small conflicts. The speed, or the time of convergence, is directly proportional to how much bandwidth is being allocated to the channel-scheduling task. For instance, if 10% of the bandwidth is used, the converting time will shorten from two seconds to about 125 milliseconds.

Figure 9A:
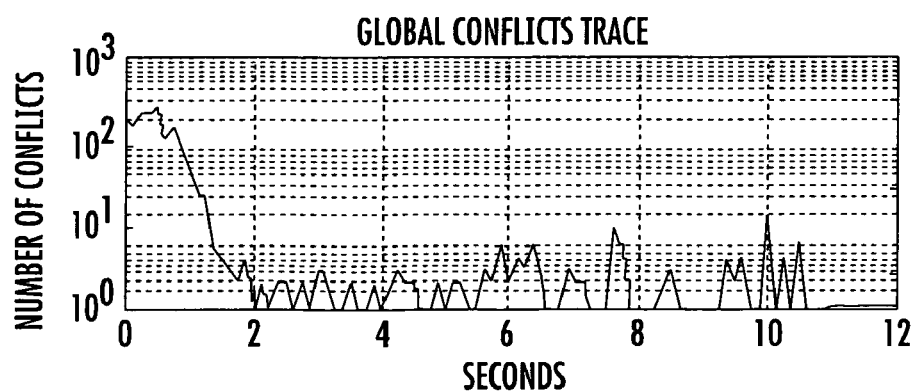
FIG. 9A is a graph showing an example of a Global Conflicts Trace with seconds on the horizontal axis and the number of conflicts on the vertical axis for the MANET as described in accordance with non-limiting examples of the present invention.

FIG. 9A is a graph showing a global conflict trace. The number of conflicts is shown on the vertical axis and number of seconds is shown on the horizontal axis. In about two (2) seconds, the global statistics of conflicts goes down to a level of a few collisions, and sometimes there are no collisions. This low level of background collisions is due to the Exchange Mechanism.

Figure 9B:
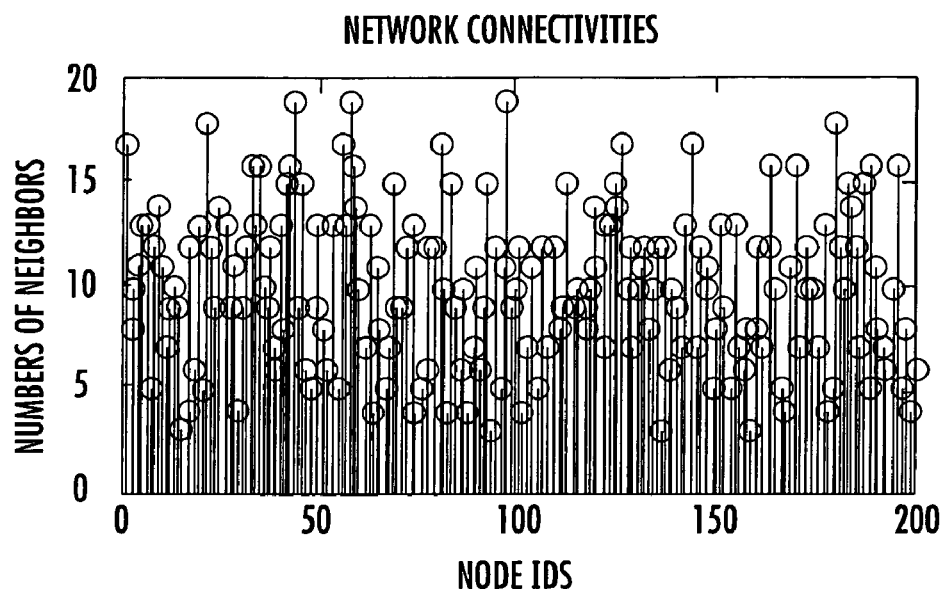
FIG. 9B is a graph showing an example of network connectivities with node IDS on the horizontal axis and the number of neighbors on the vertical axis for the MANET as described in accordance with non-limiting examples of the present invention.

FIG. 9B is a graph that illustrates network connectivity. The number of neighbors is shown on the vertical axis and node ID's are shown on the horizontal axis.

Figure 9C:
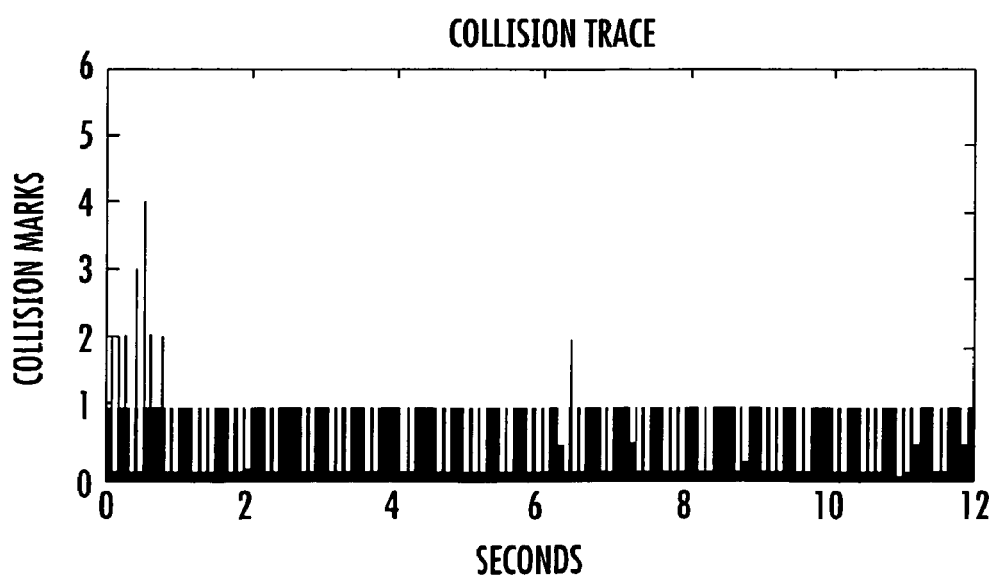
FIG. 9C is a graph showing an example of a collision trace and illustrating the slot conflict history with seconds on the horizontal axis and collision marks on the vertical axis for the MANET as described in accordance with non-limiting examples of the present invention.

FIG. 9C is a graph that illustrates the slot conflict history from a single node's perfective (node-01). When collision mark (level) of 1 is normal, there are no conflicts Level 2 and above means two packets or more are colliding on this node. The collision marks is shown on the vertical line and seconds is shown on the horizontal line.

In a dynamic network, as the network starts up, the network synchronization and channel scheduling takes place. The scheduling resolves the slot conflicts. In about two seconds, the whole network converges down to a low level of small conflicts. This level is higher than that of the static network. As nodes are moving into and out of the neighborhood of one another, slot conflicts will occur.

Figure 10A:
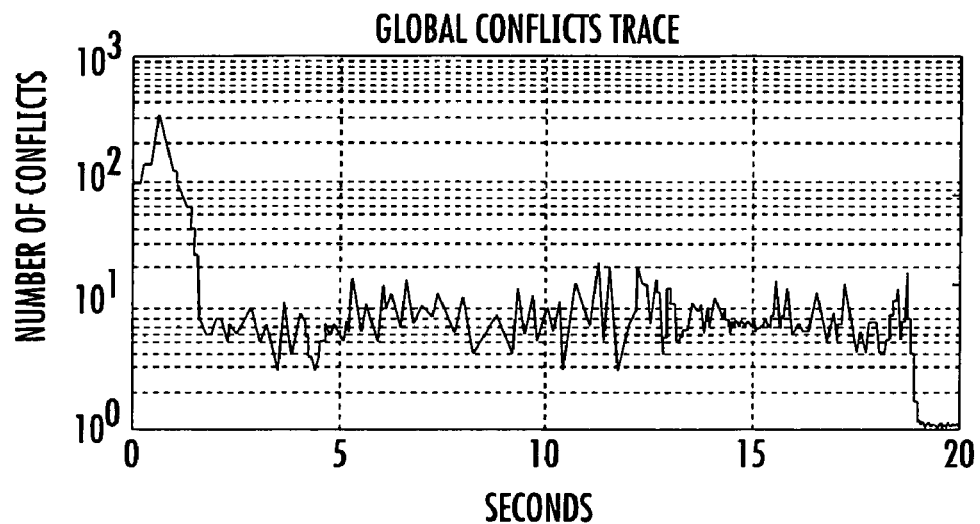
FIG. 10A is a graph showing an example of a global conflicts trace with seconds on the horizontal axis and the number conflicts on the vertical axis with the simulation lasting for about 18 seconds for the MANET as described in accordance with non-limiting examples of the present invention.

FIG. 10A is another graph showing a global conflicts trace. The simulation lasts for 18 seconds. The global conflicts trace converge down to a level of about 10 slot conflicts in the whole network. These conflicts are introduced by the change of topology due to node movements.

Figure 10B:
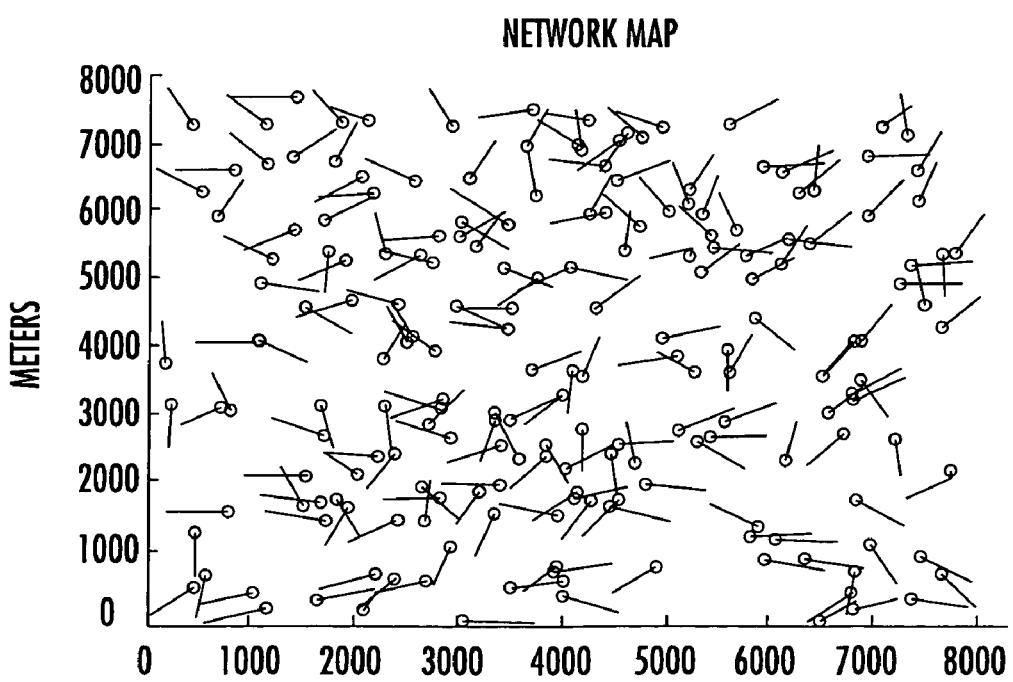
FIG. 10B is a graph showing an example of a trace of node movements with meters on both the horizontal and vertical axes, with the nodes moving about 30 meters per second in random directions for the MANET as described in accordance with non-limiting examples of the present invention.

FIG. 10B is another graph showing the trace of node movements. The nodes are moving at about 30 meters per second, at randomly selected directions.

Figure 10C:
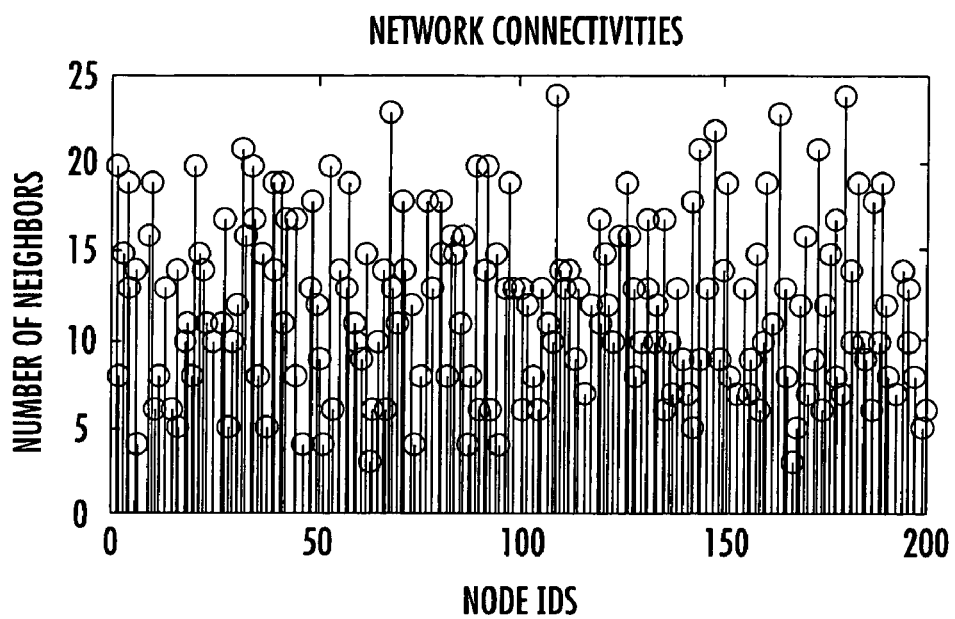
FIG. 10C is a graph showing an example of network connectivities similar to that shown in FIG. 9B, and showing node IDS on the horizontal axis and the number of neighbors on the vertical axis for the MANET as described in accordance with non-limiting examples of the present invention.
Figure 10D:
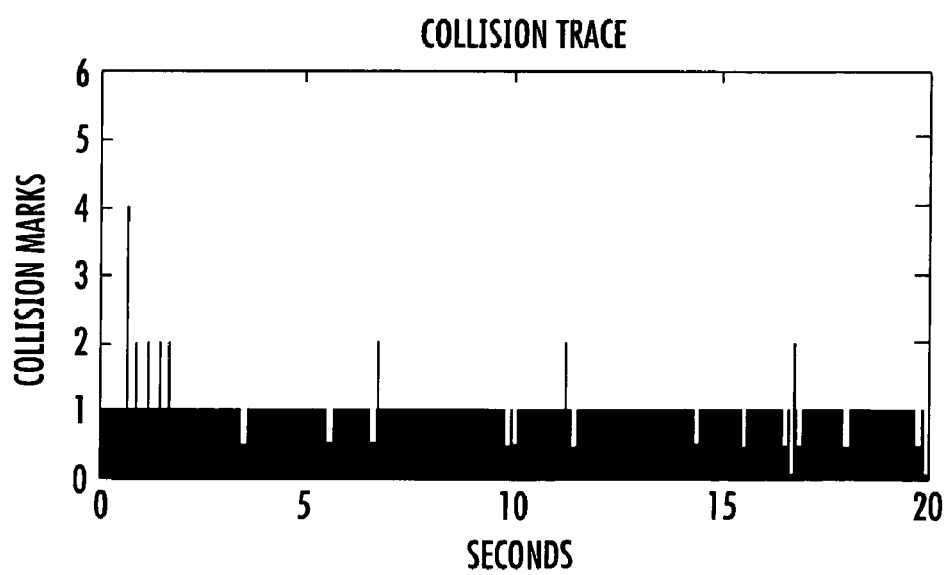
FIG. 10D is a graph showing an example of collision trace similar to that shown in FIG. 9C and illustrating a collision trace from a single node perspective and showing seconds on the horizontal axis and collision marks on the vertical axis for the MANET as described in accordance with non-limiting examples of the present invention.

FIG. 10C is a graph showing network connectivity, which is similar to that of FIG. 9B. FIG. 10D is another graph similar to that shown in FIG. 9C and showing the collision trace from a single node's perspective. There are slightly more conflicts observed. As nodes go away or coming into the neighborhood of the node, slot conflicts are resolved quickly.

In accordance with one non-limiting example of the present invention, the Neighbor Indirect Acknowledgement Algorithm (NbIA) is a fast distributed concurrent channel access scheduling algorithm with low bandwidth overhead. The neighbor nodes assist each other to find the slot in a concurrent manner.

In a distributed mechanism, all N neighbor nodes concurrently propose their aimed slots, and at the same time acknowledge to those recent successful contentions. The rest of the collisions would be resolved by an exchange mechanism, with the neighbor nodes. In fast convergence most of the local access schedule can be resolved in a few frames. In low bandwidth overhead the beacon bandwidth requirement is low because the acknowledgement message is embedded into the contention beacons. In a robust mechanism, the mechanism does not require a specific head to orchestrate the scheduling. There is no single point of failure.

A comparison table with the FPRP (Five-Phase Reservation Protocol) is shown below. The settings are
a) Network size 200 nodes;
b) Transmission range of 1.5 units;
c) Area is 14.1×14.1 square units;
d) The max number of slots per frame is 20; and
e) And the communication bandwidth at 1 Mb/s.

| | NbIA | FPRP |
|---|---|---|
| Typical Convergent Time | 20 * 3 slots | 116 * 5 time slots, |
| Minimum Beacon Size | 30 bits (Node ID, slot bit-map) | 1 bit (a long bit) |
| Network Density Dependency | Convergent time does not depend on network degree | Convergent time depends on network degree, proportionally longer |
| *** Collision Sensing | Optional (better if available) | Required |
| ** No Collsion Sensing | Converge in 20 * 30 slots (Exchange mechanism) | Not capable with this condition |
| Hidden dead-lock | *** No ** most eliminated by Exchange | *** Yes, not detectable ** Not capable |
| Topology Links | Unidirectional link tolerated | Bidirectional links required |
| Advantages | Distributed, Fast, Robust Applicable to real ad-hoc networks | Distributed, Fast, Robust, Less applicable to real ad-hoc networks |

The NbIA algorithm in accordance with one non-limiting example of the present invention, it makes use of the neighbor nodes contention chance to carry the acknowledgement to the previous sent contentions. It does so as by convenience. The second concurrent processing of an exchange mechanism is advantageous. Any two neighbor nodes can schedule with each other to exchange their transmission schedule so that some hidden conflicts will be exposed, but the switch of schedule is going to affect nodes that is at most 3-hops away. Therefore, the exchange mechanism typically solves the network schedule conflicts in 3-hops neighborhood. Optional look-through method can be used instead of the exchange mechanism. Look-through could resolve the 2-hop neighbor conflicts but with much slower convergence rate. Some of the transmission schedule will be missed, however.

To support voice, media access control (MAC) can be a barrier in ad-hoc networks. In some prior art systems, the 802.11 CSMA contention based method is a better choice of MAC in an ad-hoc network, but its non-deterministic transmission schedule becomes a QOS bottleneck as the network size and density increases. Because of this limitation, some proposals hard to make either TDMA or CDMA applicable in the ad-hoc network. The fast convergence of NbIA, in accordance with non-limiting examples of the present invention, makes a predictable transmission scheduling in ad-hoc network feasible. At the same time, it adapts to the changing network topology with ease. Because the scheduling is resolved in a concurrent and distributed manner, it requires no maintenance efforts.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for operating a mobile ad-hoc network (MANET) comprising a plurality of mobile nodes and a plurality of wireless communications links connecting the mobile nodes together, which comprises:
   an "n" number of mobile nodes concurrently contending for a plurality of Time Division Multiple Access (TDMA) slots in a frame using beacons from mobile nodes that are neighboring an n-hop distance to a source mobile node;
   each neighboring node selecting a TDMA slot per frame and acknowledging any successful beacons;
   for neighboring nodes not receiving an acknowledgement for successful beacons, contending on empty TDMA slots; and
   resolving residual collisions for those neighboring nodes that had not received an acknowledgement for successful beacons using a collision detection mechanism utilizing a message exchange mechanism with a first neighboring node by temporarily exchanging a beacon transmission time with a second neighboring node wherein the first and second neighboring nodes each transmit their beacons in the other nodes' beacon slot for reception by a neighboring node to detect beacon collisions.

2. The method according to claim 1, wherein said neighboring nodes are positioned within a two-hop distance.

3. The method according to claim 1, wherein each node continues on a TDMA slot for a plurality of frames.

4. The method according to claim 1, wherein the step of resolving residual collisions comprises using a void of bits within a Beacon Occupancy Vector (BOV).

5. The method according to claim 1, which further comprises embedding an acknowledgement message into a beacon by selecting most recently heard beacons that are referenced to a transmission time within a single frame.

6. The method according to claim 1, which further comprises propagating a timing reference throughout the network for synchronizing a plurality of mobile nodes.

7. The method according to claim 6, which further comprises determining a timing reference by synchronizing with a mobile node that has a global positioning sensor (GPS) or synchronizing with a mobile node that is selected to represent a network timing reference.

8. The method according to claim 6, which further comprises adopting within a mobile node a received timing reference from a packet when the mobile node has not synchronized its internal timing to an external timing reference.

9. The method according to claim 6, which further comprises synchronizing within a node to a timing reference that has been received and has a higher preference than the timing reference that the node has already been synchronized.

10. A method for operating a mobile ad-hoc network (MANET) comprising a plurality of mobile nodes and a plurality of wireless communications links connecting the mobile nodes together, which comprises:
    an "n" number of mobile nodes concurrently contending for a plurality of Time Division Multiple Access (TDMA) slots in a frame using beacons from mobile nodes that are neighboring an n-hop distance to a source mobile node;
    each neighboring node selecting a TDMA slot per frame and acknowledging any successful beacons;
    for neighboring nodes not receiving an acknowledgement for successful beacons, contending on empty TDMA slots; and
    resolving residual collisions for those neighboring nodes that had not received an acknowledgement for successful beacons by exchanging a transmission schedule with a selected neighboring node using a void of bits within a Beacon Occupancy Vector (BOV) and a two-level BOV to distribute TDMA slot occupancy information to neighboring nodes and compensating for topology change due to node movement.

11. The method according to claim 10, wherein said neighboring nodes are positioned within a two-hop distance.

12. The method according to claim 10, wherein each node continues on a TDMA slot for a plurality of frames.

13. The method according to claim 10, which further comprises embedding an acknowledgement message into beacon slot contentions for reducing beacon bandwidth requirements.

14. The method according to claim 10, which further comprises receiving an acknowledgement of a beacon and maintaining a transmit schedule.

15. The method according to claim 10, which further comprises propagating a timing reference throughout the network for synchronizing a plurality of mobile nodes.

16. The method according to claim 15, which further comprises determining a timing reference by synchronizing with a mobile node that has a global positioning sensor (GPS) or synchronizing with a mobile node that is selected to represent a network timing reference.

17. The method according to claim 15, which further comprises adopting within a mobile node a received timing reference from a packet when the mobile node has not synchronized its internal timing to an external timing reference.

18. The method according to claim 15, which further comprises synchronizing within a node to a timing reference that has been received and has a higher preference than the timing reference that the mobile node has already been synchronized.

19. A mobile ad-hoc network (MANET) comprising:
    a source mobile node;
    a destination mobile node; and a plurality of neighboring mobile nodes, wherein said neighboring mobile nodes are operative for concurrently contending for a plurality of Time Division Multiple Access (TDMA) slots in a frame using beacons, each neighboring node selecting a TDMA slot per frame and acknowledging any successful beacons, wherein for neighboring nodes not receiving an acknowledgement for successful beacons, contending on empty TDMA slots and resolving residual collisions for those neighboring nodes that had not received an acknowledgement for successful beacons using a collision detection mechanism using a message exchange mechanism with a first neighboring node by temporarily exchanging a beacon transmission time with a selected second neighboring node wherein the first and second neighboring nodes each transmit their beacons in the other nodes' beacon slot for reception by a neighboring node to detect beacon collisions.

20. The MANET according to claim 19, wherein each mobile node comprises a communications device to communicate wirelessly with other mobile nodes, and a controller to route communications via the communications device.

21. The MANET according to claim 19, and further comprising a timing reference that is propagated throughout the network for synchronizing a plurality of mobile nodes.

22. The MANET according to claim 19, and further comprising a mobile node having a global positioning sensor (GPS) to which other mobile nodes are synchronized.

23. The MANET according to claim 19, and further comprising a mobile node that is operative as a network timing reference.

* * * * *